Feb. 20, 1962 G. S. BAHRS ET AL 3,022,469

VOLTAGE TO FREQUENCY CONVERTER

Filed Jan. 4, 1960 3 Sheets-Sheet 1

GEORGE S. BAHRS
MALCOLM M. McWHORTER
DALTON W. MARTIN
*INVENTORS*

BY [signature]
ATTORNEYS

GEORGE S. BAHRS
MALCOLM M. McWHORTER
DALTON W. MARTIN
*INVENTORS*

BY
Flehr and Swain
ATTORNEYS

VOLTAGE TO FREQUENCY CONVERTER

GEORGE S. BAHRS
MALCOLM M. McWHORTER
DALTON W. MARTIN
*INVENTORS*

*BY*

Flehr and Swain
ATTORNEYS 3,022,469

VOLTAGE TO FREQUENCY CONVERTER

George S. Bahrs, 799 Berkeley Ave., Menlo Park, Calif; Malcolm M. McWhorter, 150 Gabarda Way, Menlo Park, Calif.; and Dalton W. Martin, 3200 Louis Road, Palo Alto, Calif.

Filed Jan. 4, 1960, Ser. No. 338
20 Claims. (Cl. 332—14)

This invention relates generally to a voltage to frequency converter.

In many applications, it is desirable to have signal intelligence in the form of frequency rather than voltage. For example, if it is desired to magnetically record the signal, it should preferably be in the form of frequency. This permits use of simpler recording apparatus. The intelligence can be more accurately recovered than when the signal intelligence is in the form of a voltage. Amplitude variations in the recording and reproducing process do not effect recovery of the signal intelligence.

Another example of the use of signal intelligence in the form of frequency rather than voltage is in telemetry where it may be necessary to transmit signal intelligence (data) over considerable distances. By transmitting frequency, the signal medium may introduce amplitude variations without effecting the transmitted intelligence.

In general, prior art voltage to frequency converters have employed the input signal to charge a capacitor to a predetermined level. The capacitor is then discharged. The frequency of discharge is dependent upon the magnitude of the input signal. In general, the capacitor is discharged by the firing of some voltage sensitive device or circuit, for example, a neon lamp. During the discharge period, the signal source is shunted by the discharging circuit. As the input signal increases and the operating frequency increases, the input circuit is shorted through the discharging device for an increasing fraction of the time. As a consequence, the relationship between voltage and frequency is not linear because the sensitivity of the instrument decreases as the input frequency increases.

It is a general object of the present invention to provide an improved voltage to frequency converter.

It is another object of the present invention to provide a voltage to frequency converter which is linear in operation over a relatively large range of input signals (frequency deviation) of the converter and stable over a wide range of temperatures.

In many applications, it is desirable to employ apparatus of the foregoing character to convert signals obtained from transducers, such as pressure transducers, thermocouples, and the like. As is well known, transducers of this type should be operated into relatively high impedance loads for accurate results. Furthermore, signals of this type are relatively small requiring an apparatus with high sensitivity.

It is a further object of the present invention to provide a voltage to frequency converter which is responsive to relatively small voltage signals.

It is a further object of the present invention to provide a voltage to frequency converter in which the scale factor or sensitivity can be easily changed.

In the present apparatus as in certain prior art apparatus, the voltage on an input or integrating capacitor is maintained near zero by repetitively supplying the integrating capacitor with a current pulse having a precisely controlled charge content. In some of the prior art apparatus, these standard charge pulses are developed through the use of elaborate circuits which assure that both the duration and amplitude of the current pulse remain constant, thus assuring that the product or charge remains constant. In other prior art apparatus, circuits depending upon the saturation characteristics of a magnetic core are employed to develop a standard charge pulse. Such characteristics are generally sensitive to temperature variations.

It is, therefore, an object of the present invention to provide a voltage to frequency converter which does not depend for its operation on the characteristics of a precision timing circuit or upon the stability of a magnetic core circuit.

In any voltage to frequency converter there must be some sort of reference against which the input voltage is compared. In the present apparatus and in certain prior art apparatus, the reference is a precisely controlled voltage obtained from a voltage regulator. Since the accuracy of the apparatus can be no better than the stability of the reference voltage, high accuracy voltage to frequency converters generally require elaborate and expensive reference voltage supplies.

It is another object of the present invention to provide a voltage to frequency converter in which the circuits are so arranged that the reference voltage may be derived from a simple Zener diode regulator.

It is a further object of the present invention to provide a voltage to frequency converter wherein the quiescent frequency and the scale factor are dependent essentially only upon a single capacitor and a small number of resistors.

It is a further object of the present invention to provide a transistorized voltage to frequency converter.

These and other objects of the invention will become more clearly apparent from the following description when taken in conjunction with the accompanying drawing.

Referring to the drawing.

Figure 4:
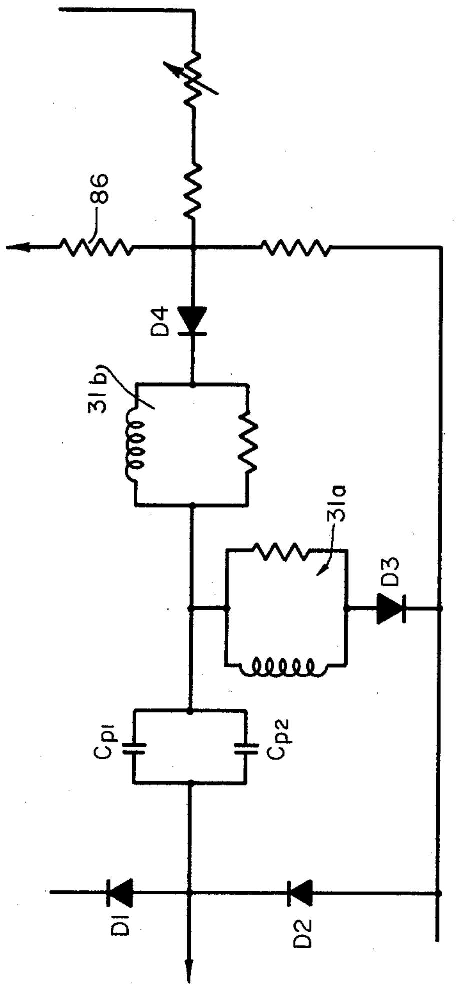

FIGURES 3A–I show the waveforms at various points in the circuits illustrated in the drawings; and FIGURE 4 shows another switching or steering circuit in accordance with the invention.

Figure 1:
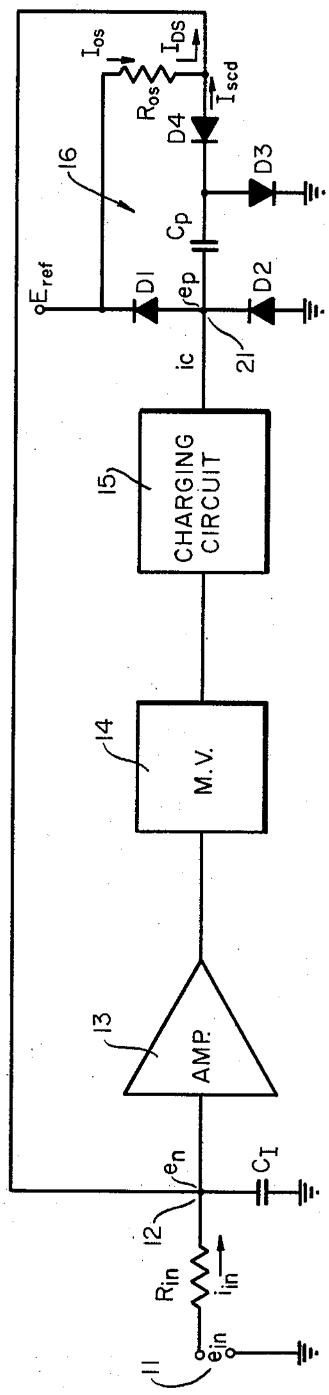
FIGURE 1 is a schematic diagram of a voltage to frequency converter in accordance with the present invention.

Referring to FIGURE 1, the input signal $e_{in}$ is applied to the terminals 11 and serves to charge the integrating capacitor $C_I$ through the series resistor $R_{in}$. As will become presently apparent, the integrating capacitor $C_I$ operates with substantially zero volts across the same so that the current flowing into the capacitor from the source is given approximately by the expression $$i_{in}=\frac{e_{in}}{R_{in}}$$

The charging current $i_{in}$ serves to charge the capacitor and vary the voltage $e_N$ at the node 12.

The node 12 is connected to the input of a high gain D.-C. amplifier 13 which presents a high impedance to the capacitor $C_I$ and serves to amplify the voltage appearing on the capacitor and apply the amplified voltage to a multivibrator 14. The multivibrator 14 develops a control pulse of approximate period T (FIGURE 3D) whenever the applied voltage reaches a predetermined level, for example, zero. If the voltage is held at or above zero volts, the multivibrator continuously puts out pulses of period T at a relatively high frequency.

A charging circuit 15 and a charge-dispensing circuit 16 in combination make up a "standard charge dispenser." The circuits respond to the output from the multivibrator 14 to provide a pulse having a standard charge $Q_s$ each time a pulse is applied from the multivibrator. As will be presently described, the charge dispensed by the standard charge dispensing circuit is always of the same magitude. The average current from the standard charge dispenser $I_{scd}$ is, therefore, exactly proportional to frequency. Another way of stating the action of the charge dispensing circuit is to say that it produces a current pulse each time it is triggered and this current pulse has a precisely controlled current times time product. As will be described, the amplitude of the pulse may vary slightly as conditions in the circuit change, but the circuit is so arranged that the product of pulse width times current pulse amplitude is always constant. Thus, the circuit is not critically dependent upon timing circuits.

Figure 3:
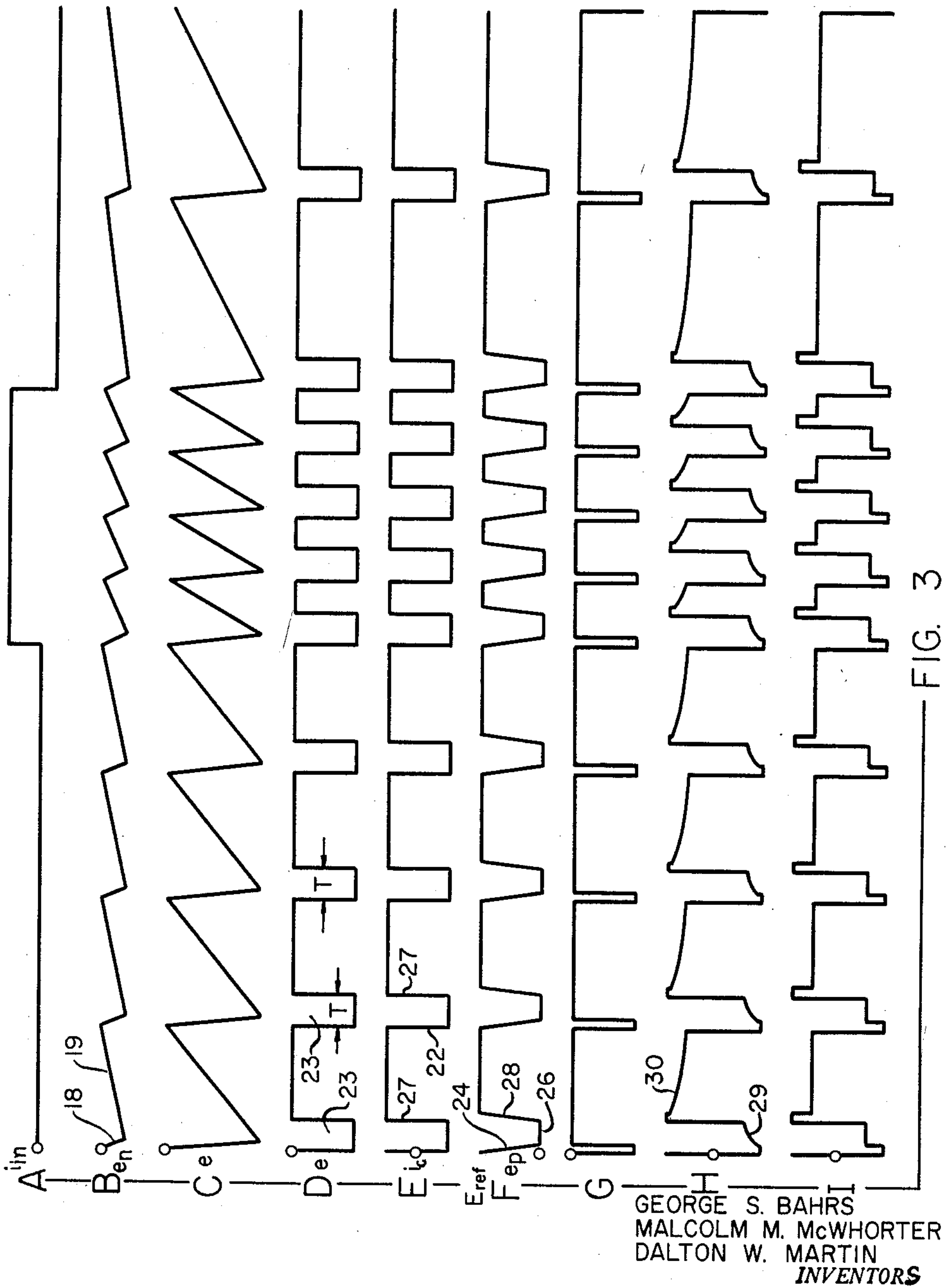

The standard charge $Q_s$ is drawn from the capacitor and serves to lower the voltage $e_N$ below zero as indicated in FIGURE 3B by the portion of the curve 18. The input signal indicated in FIGURE 3A serves to charge the integrating capacitor as indicated by the line 19, FIGURE 3B, until it reaches zero volts at which time the multivibrator 14 is again triggered, in turn activating the charge dispensing circuitry 15 and 16 to draw out another standard charge $Q_s$ from the integrating capacitor $C_I$.

In a typical example, the voltage on the capacitor will vary 100 microvolts peak to peak, while the amplifier 13 will amplify the voltage to provide an input signal (FIGURE 3C) to the multivibrator 14 which is suitable for firing the multivibrator and which may, for example, have an amplitude of several volts peak to peak.

It can be seen that the overall circuit operates at such a frequency as to maintain the voltage $e_N$ across the integrating capacitor $C_I$ very near zero. This means that the integrating capacitor is neither charged nor discharged by any appreciable amount. The average current flowing into the capacitor is maintained at substantially zero.

As can be seen from the diagram, current flowing into the capacitor consists of two components: one, a constant current component consisting of a current $I_{os}$ which is an offset current derived by placing a resistor $R_{os}$ between the reference source $E_{ref}$ and the integrating capacitor; and another component of current $i_{in}$ which flows through the resistor $R_{in}$ by virtue of the input voltage $e_{in}$.

A third component of current which opposes the combined components above is developed by the standard charge dispenser and is given by $I_{scd}$ as previously described. For the capacitor voltage to remain near zero, the average current flowing out of the capacitor must exactly balance the current flowing in. Since the charge per cycle provided by the standard charge dispenser is constant, the maintaining of this current balance implies that the frequency is exactly proportional to the sum of $i_{in}+I_{os}$. If $e_{in}$ is increased, $i_{in}$ will increase and the standard charge dispenser will have to operate more rapidly to provide an increased average current to balance out the increased input current $i_{in}$.

Assume, for example, that with no input current $i_{in}$, the device will operate at some frequency $f_0$ which is dependent upon the amplitude of the offset current and which is the center frequency. Input voltages of either polarity will cause this frequency to deviate about the center frequency.

The charge dispensing circuit 16 includes a precision capacitor $C_p$. Serially connected diodes $D_1$ and $D_2$ are connected between the voltage reference source $E_{ref}$ and ground and have their common terminal connected to one terminal of the precision capacitor $C_p$. Steering diodes $D_3$ and $D_4$ are connected to the other terminal of the capacitor $C_p$ with the diode $D_3$ connected to ground and the diode $D_4$ connected to the integrating capacitor $C_I$. A resistor $R_{os}$, previously described, is connected between the reference source $E_{ref}$ and the capacitor $C_I$ and provides an offset current $I_{os}$.

If a voltage to frequency converter is to be extremely sensitive, then the average current drawn by the "standard charge dispenser" must be very small. It is frequently most convenient to make this current small by placing a resistive current dividing network at the output of the standard charge dispenser, such as shown at 61, 62 and 63 of FIGURE 2.

To understand the operation of the standard charge dispenser, assume that $e_p$ at node 21 is initially at the voltage $E_{ref}$ with the current $i_c$ positive. Then, when the current $i_c$ (FIGURE 3E) reverses 22 due to a pulse 23 (FIGURE 3D) from the multivibrator 14, current is pulled out of the precision capacitor $C_p$ causing the voltage $e_p$ to fall in an approximately linear manner 24 until it reaches zero, at which time the diode $D_2$ will begin to conduct so that the voltage $e_p$ can drop no further.

Once clamping diode $D_2$ begins to conduct and to divert the current $i_c$ to ground, $C_p$ experiences no further discharging as indicated by the flat portion 26 of the curve, FIGURE 3F. Things remain in this state until the current from the charging circuit reverses 27 (FIGURE 3E) and is again positive, at which time $C_p$ is now charged as indicated by the line 28 (FIGURE 3F) and the voltage $e_p$ begins to increase in an approximately linear manner until $e_p$ reaches the reference voltage $E_{ref}$, at which time the diode $D_1$ conducts clamping the voltage $e_p$ near $E_{ref}$.

Each time the charging circuit operates, the voltage $e_p$ swings between $E_{ref}$ and zero and back to $E_{ref}$. Each time $C_p$ is discharged, the current flowing through $C_p$ has to go through the steering diodes $D_3$ and $D_4$. Discharge current (FIGURE 3G) is routed through the diode $D_4$ into the input node 12, that is, into the integrating capacitor $C_I$. The charging current is routed by the steering diode $D_3$ down to ground. The total charge passed by the diode $D_4$ each cycle is simply the voltage change times the value of the capacitor, or very nearly $E_{ref}\times C_p$. Thus, a standard charge is dispensed each cycle of operation.

The exact voltage change experienced by the capacitor each cycle is $E_{ref}$ plus the forward drops in the clamp diodes $D_1$ and $D_2$, minus the final-value forward voltage drops in the switching diodes $D_3$ and $D_4$. As shown in FIGURE 3H, the drop in diode $D_3$ decays with time following the charging interval as shown at 29, and the drop in diode $D_4$ decays with time following the discharge interval as shown at 30. Since the time allowed for the drop in diode $D_4$ to decay changes with frequency, the voltage change experienced by the precision capacitor changes with frequency so that the frequency versus input voltage relationship is slightly non-linear.

Figure 2:
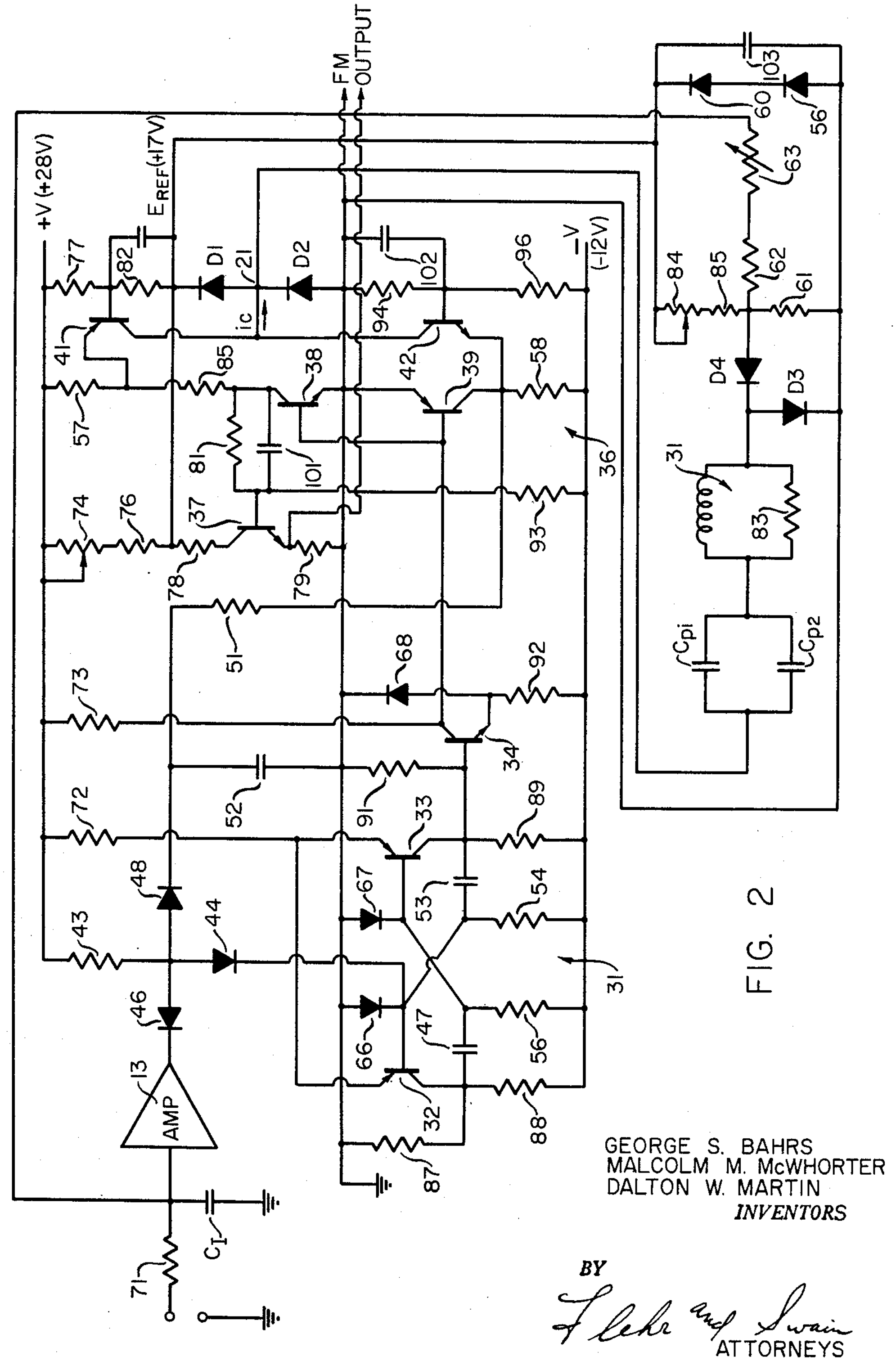
FIGURE 2 is a detailed circuit diagram of a portion of the circuit of FIGURE 1.

The operation of the instrument may be made extremely linear by making the final-value voltage drop in diode $D_4$ independent of frequency. This improvement may be brought about by placing a properly damped inductive network 31 in series with $C_p$ as shown in FIGURE 2. This addition leads to the waveform shown at FIGURE 3I. Sufficient energy is stored in the inductor during the current pulse that when the current through $C_p$ begins to cease, the inductor, in opposing this change in current, provides a voltage change across $C_p$ great enough to virtually cut off the switching diode so that no further voltage change takes place. Since the final-value of switching diode drop is now independent of frequency, the operation of the instrument is highly linear. A linearity of better than $\pm 0.02\%$ of full-scale is readily obtained in an instrument for which the frequency is deviated $\pm 40\%$ about center frequency. Addition of the inductor also reduces the temperature dependence of the instrument.

The voltage change across $C_p$ caused by the inductor depends only upon the value of the inductor and the magnitude of the current pulse, the final-value voltage drop in diode $D_3$ and $D_4$ always differs from the initial value drop by a fixed amount. The initial drop is the drop observed with the full charging or discharging current flowing through the diode. Since these are the same currents which flow in diodes $D_1$ and $D_2$ during the clamp intervals, the $D_3$ and $D_4$ drops exhibit the same temperature dependence as the $D_1$, $D_2$ drops. Thus, the changes with temperature in the steering diode drops exactly cancel those in the clamp diode drops making the operation of the circuit virtually independent of temperature. A center frequency stability of better than ±0.1% over the temperature range of 0° C. to 65° C. is readily obtained.

Because of the damping effect of the load resistor in series with diode $D_4$, it is sometimes desirable to use separate inductive networks, one *31a* in series with diode $D_3$, and the other *31b* in series with diode $D_4$ as shown in FIGURE 4 with the inductors and the damping resistors employed having different values.

Operation of the circuit to convert voltage to frequency may more easily be understood from the following analysis.

$$Q=E_{ref}\cdot C_p \quad (1)$$

$$I_{scd}=f\cdot E_{ref}C_p \quad (2)$$

For $C_I$ not to accumulate charge, $$I_{os}+i_{in}=I_{scd} \quad (3)$$

$$I_{os}+i_{in}=f\cdot E_{ref}C_p \quad (4)$$

Assuming, $$e_n \ll E_{ref}$$

and $$e_n \ll e_{in}$$

Then, $$I_{os}=E_{ref}/R_{os} \quad (5)$$

and $$i_{in}=\frac{e_{in}}{R_{in}} \quad (6)$$

Thus, substituting in (4)

$$\frac{E_{ref}}{R_{os}}+\frac{e_{in}}{R_{in}}=fE_{ref}C_p \quad (7)$$

solving, $$f=\frac{1}{R_{os}C_p}1+\frac{R_{os}}{R_{in}}\cdot\frac{e_{in}}{E_{ref}} \quad (8)$$

for zero input:

$$f=f_0=\frac{1}{R_{os}C_p} \quad (9)$$

The frequency $f_0$ is just the inverse of the time constant determined by the resistor $R_{os}$ and the capacitor $C_p$. Thus, it is observed that the frequency $f_0$ in the absence of input signal is independent of $E_{ref}$. It is also observed that by changing $E_{ref}$, it is possible to change the scale factor or sensitivity of the instrument.

Referring now to FIGURE 2, a more detailed circuit diagram of the multivibrator 14, charging circuit 15, and standard charge dispenser 16 is presented. Note that a current dividing network consisting of resistors 61, 62 and 63 has been included at the output of the standard charge dispenser. This current division increases the sensitivity of the instrument.

The multivibrator 14 is shown at 31 and includes transistors 32 and 33. The output of the multivibrator is shaped by a clipping stage including the transistor 34. The shaped output is applied to the charging circuit 15 designated generally by the reference numeral 36 and comprising transistors 37, 38, 39, 41 and 42.

Resistor 43 is connected to the plus voltage supply line and positive current flows through it and through the diode 44 towards the base of the transistor 32. This current is in such a direction as to prevent transistor 32 from going on, and thus to prevent the controlled multivibrator from operating. When the output of the amplifier 12 goes negative, then the diode 46 conducts and diverts the current from resistor 43 so that it no longer flows to diode 44 and no longer prevents transistor 32 from conducting. This allows the controlled multivibrator to start a cycle of operation.

The change of state of the multivibrator 31 is characterized by a reduction of the base current which serves to hold the conducting transistor on. A feedback network including the capacitor 47 begins to apply a bias to the base of the transistor 33 which starts to turn off this transistor. This process continues at an increasing rate until the transistor 32 is fully on and transistor 33 is fully turned off. Simultaneously, feedback from the charging circuit is applied to the diode 48 so that it diverts the current from resistor 43 away from the junction point in a new direction but still away from the base of the transistor 32.

The operation to divert current takes place in the following manner: transistor 33 acts on transistor 34 which, in turn, acts on transistors 38 and 39. Transistor 39 is turned off so that the voltage on its collector goes negative. This causes a current to flow through the RC network including resistor 51 and capacitor 52 and through the diode 48. This causes diode 48 to conduct, thus diverting current from the resistor 43 so that even if the amplifier output goes positive again, the current from the resistor 43 is still diverted and the controlled multivibrator is enabled to complete its cycle in spite of the positive voltage at the output of the amplifier 13. Were the delay network and diode 48 not included, the controlled multivibrator would go only part way through its cycle and the charging action would only be partly complete.

It should be noted that if the output of the amplifier 13 remains positive continuously, the multivibrator operates at a relatively high frequency determined by the timing elements 47, 53, 54 and 56. This special multivibrator is necessary so that when the voltage from the amplifier 13 is positive, the multivibrator will continue to free run until the capacitor voltage $e_n$ has been brought down near zero, at which time the circuit can then go into its normal mode of operation as described above.

The current $i_c$ to the common node 21 is supplied from the collectors of the complementary transistors 41 and 42 arranged so that one supplies positive and the other negative current $i_c$. The control transistors 38 and 39 are connected to receive the output from the shaping stage including transistor 34.

The shaped output is employed to control the base current of transistors 38 and 39. Since these are also connected in a complementary symmetry arrangement, a positive input causes transistors 38 to go on and 39 to go off. When transistor 38 goes on, it diverts current from the resistor 57 which causes the transistor 41 to go off and at the same time it maintains the transistor 39 off and allows current to be supplied through the resistor 58 to turn on the transistor 42 which gives a negative $i_c$.

As soon as the time T has elapsed, the multivibrator switches back to its original state, the situation is reversed and the transistor 39 begins to conduct and divert the current from resistor 58 so that transistor 42 is turned off. Transistor 38 goes off so that the current flowing through resistor 57 is able to flow to the emitter of transistor 41. Thus, collector current flows in transistor 41 thereby supplying a positive $i_c$. The action of the diode 48 which causes the multivibrator to go through its complete cycle of operation without interruption was previously described.

The reference voltage for the complete system is derived from a relatively simple reference source which includes the Zener diodes 56 and 60 connected to give a predetermined reference voltage. Were the special circuit including transistor 37 not included, the current flowing into the reference voltage source would charge quite significantly with a change in frequency. The dynamic impedance of Zener diodes is great enough that this change in current would produce an intolerable change in reference voltage. One solution would be to furnish a reference voltage supply having low internal impedance and excellent stability. This would necessitate the addition of a chopper and several transistors. This added complexity and expense has been avoided through the addition of a circuit which keeps the current flowing through the reference elements sufficiently constant that Zener diodes may be used directly.

The reason for a change in the current flowing into the reference source may be understood through examination of FIGURE 3F. During the time that $e_p$ is clamped at $E_{ref}$ by diode $D_1$, the current $i_c$ flows into the reference source. The fraction of the time that $i_c$ flows into the reference supply decreases as frequency is increased; thus, the average current flowing into the reference supply decreases as frequency is increased.

In accordance with the present invention, there is provided a current path which is switched on whenever transistor 41 is on. This path consists of transistor 37 and associated resistors. When transistor 37 is on, current is diverted from the reference supply. Thus, whenever transistor 41 is suppliyng current $i_c$, there is diverted from the reference supply a current approximately equal to $i_c$. The current flowing through the reference diodes is thus maintained sufficiently constant.

A voltage to frequency converter as shown in FIGURE 2 was constructed with the various components and voltages being as follows:

Voltages:
- $+V$=28 volts
- $-V$=−12 volts

Diodes:

| | |
|---|---|
| **44** | IN252 |
| **46** | IN469 |
| **48** | IN96 |
| $D_1$ | S131 |
| $D_2$ | S131 |
| $D_3$ | S131 |
| $D_4$ | S131 |
| **56** | IN1530 |
| **60** | IN1530 |
| **66** | IN252 |
| **67** | IN252 |
| **68** | IN748A |

Transistors:

| | |
|---|---|
| **32** | 2N581 |
| **33** | 2N581 |
| **34** | 2N446A |
| **37** | 2N446A |
| **38** | 2N446A |
| **39** | 2N581 |
| **41** | 2N414 |
| **42** | 2N446A |

Resistors (ohms):

| | |
|---|---|
| **43** | 33K |
| **51** | 1.5K |
| **54** | 22K |
| **56** | 22K |
| **57** | 1K |
| **58** | 1.2K |
| **61** | 21 |
| **62** | 5K |
| **63** | 10K |
| **71** | 25K |
| **72** | 4.7K |
| **73** | 10K |
| **74** | 500 |
| **76** | 680 |
| **77** | 3.3K |
| **78** | 1.2K |
| **79** | 47 |
| **81** | 22K |
| **82** | 680 |
| **83** | 330 |
| **84** | 1K |
| **85** | 13.7K |
| **87** | 1.5K |
| **88** | 1.5K |
| **89** | 1.5K |
| **91** | 1.5K |
| **92** | 1.5K |
| **93** | 100K |
| **94** | 680 |
| **96** | 3.3K |

Capacitors:

| | |
|---|---|
| $C_I$ | .033 mf. |
| **47** | 220 mmf. |
| **52** | 470 mmf. |
| **53** | 220 mmf. |
| $C_{P1}$ | 15 mmf. |
| $C_{P2}$ | 300 mmf. |
| **101** | 220 mmf. |
| **102** | .01 mf. |
| **103** | 1.0 mf. |

The circuit was tested and the performance was as follows:

(1) Center frequency (no input signal): 216 kc.
(2) Sensitivity: ±5 mv. input produces ±40% deviation.
(3) Input resistance: 25K.
(4) Linearity: better than ±0.02% of full scale for ±40% frequency deviation.
(5) Stability: center frequency drift less than 0.1% during 24 hour test at normal room temperature and line voltage.
(6) Stability: center frequency drift less than 0.2% for temperature variations between 25° C. and 65° C.

Thus, it is seen that there is provided a highly sensitive voltage to frequency converter which has excellent linearity and stability.

We claim:

1. A voltage to frequency converter comprising an integrating network connected to receive an input signal, pulse generating means coupled to said integrating network and adapted to form pulses when the voltage on said network reaches a predetermined voltage level, a precision capacitor having first and second terminals, means responsive to the pulses serving to swing the first terminal from a first voltage level to a second voltage level and back once for each applied pulse to cause flow of charging and discharging currents alternately through the precision capacitor, first and second current paths connected to the second terminal and serving to route separately the charging and discharging currents from the precision capacitor, and means for coupling one of said current paths to the integrating network.

2. A voltage to frequency converter comprising an integrating network connected to receive an input signal, amplifying means connected to amplify the voltage across the integrating network, pulse generating means connected to receive the output of the amplifying means and serving to produce pulses when the amplified voltage reaches a predetermined voltage level, a precision capacitor having first and second terminals, means responsive to the pulses serving to swing the first terminal from a first voltage level to a second voltage level and back once for each applied pulse to cause flow of charging and discharging currents alternately through the precision capacitor, first and second current paths connected to the second terminal and serving to route separately the charging and discharging capacitor, and means for coupling one of said current paths to the integrating network.

3. A voltage to frequency converter comprising an integrating network connected to receive an input signal, pulse generating means coupled to the integrating network and adapted to form pulses when the voltage on the network reaches a predetermined level, a precision capacitor having first and second terminals, means responsive to the pulses serving to swing the first terminal from a first voltage level to a second voltage level and back once for each applied pulse to cause flow of charging and discharging currents alternately through the precision capacitor, first and second current paths each including uni-directional conducting devices connected to the second terminal and serving to route separately the charging and discharging currents from the precision capacitor, and means for coupling one of said current paths to the integrating network.

4. A voltage to frequency converter comprising an integrating network connected to receive a current proportional to an input signal, pulse generating means adapted to form pulses when the voltage across the integrating network reaches a predetermined level, a precision capacitor having first and second terminals, means responsive to the pulses serving to swing the first terminal from a first voltage level to a second voltage level and back once for each applied pulse to cause flow of charging and discharging currents alternately through the precision capacitor, a diode network providing first and second current paths connected to the second terminal and each serving to route separately charging and discharging currents from the precision capacitor, inductive means connected in circuit between at least one of said diodes and the precision capacitor, and means for coupling one of said current paths to the integrating capacitor.

5. A voltage to frequency converter comprising an integrating network connected to receive an input signal, pulse generating means serving to form pulses when the voltage across the integrating capacitor reaches a predetermined level, a precision capacitor having first and second terminals, means responsive to the pulses serving to swing the first terminal from a first voltage level to a second voltage level and back once for each applied pulse to cause flow of charging and discharging current alternately through the precision capacitor, first and second current paths connected to the second terminal and serving to route separately charging and discharging current from the precision capacitor, and current dividing means connected in one of said current paths, and means for coupling the current dividing means to the integrating network.

6. A voltage to frequency converter comprising an integrating capacitor connected to receive an input signal, pulse generating means connected to said capacitor and adapted to form pulses when the voltage on the capacitor reaches a predetermined level, a precision capacitor having first and second terminals, means responsive to the pulses serving to swing the first terminal from a first voltage level to a second voltage level and back once for each applied pulse to cause flow of charging and discharging currents alternately through the precision capacitor, first and second current paths connected to the second terminal and each serving to route separately charging and discharging currents from the precision capacitor, current dividing means for connecting one of said current paths to the integrating capacitor, and means for providing an offset current to the integrating capacitor.

7. A voltage to frequency converter comprising an integrating network connected to receive an input signal, pulse generating means adapted to form an output pulse when the voltage on the integrating network reaches a predetermined level, a precision capacitor having first and second terminals, first and second lines having predetermined voltages, a pair of unidirectional conducting devices connected between said lines with their common terminal connected to the first terminal of the precision capacitor, means for alternately causing conduction of said uni-directional conducting devices to thereby connect the first terminal of the precision capacitor to said lines whereby the voltage of the first terminal of the precision capacitor is alternately that of the first and second lines, first and second current paths connected to the second terminal and serving to route separately charging and discharging currents from the precision capacitor, and means for coupling one of said current paths to the integrating network.

8. A voltage to frequency converter as in claim 7 wherein said means for coupling one of said current paths to the integrating capacitor includes a current dividing circuit.

9. A voltage to frequency converter as in claim 7 including additionally an inductive circuit connected in at least one of said current paths.

10. A voltage to frequency converter comprising an integrating network connected to receive a current proportional to an input signal, pulse generating means adapted to form an output pulse when the voltage on the integrating network reaches a predetermined level, a precision capacitor having first and second terminals, first and second lines having predetermined voltages, a pair of uni-directional conducting devices connected between said lines with their common terminal connected to the first terminal of the precision capacitor, means responsive to the output of the pulse generating means for supplying alternately positive and negative current to said terminal to thereby charge and discharge the capacitor and cause the uni-directional means to alternately conduct to clamp the common terminal to the voltage of one or the other of said lines, first and second current paths connected to the second terminal and serving to route separately charging and discharging currents from the precision capacitor, and means for coupling one of said current paths to the integrating network.

11. A voltage to frequency converter as in claim 10 wherein said means for coupling one of said current paths to the integrating capacitor includes a current dividing circuit.

12. A voltage to frequency converter as in claim 10 including additionally an inductive circuit connected in at least one of said current paths.

13. A voltage to frequency converter comprising an integrating capacitor connected to receive a current proportional to an input signal, pulse generating means coupled to receive the voltage on the capacitor and serving to form an output pulse when the voltage reaches a predetermined level, a precision capacitor having first and second terminals, first and second lines having predetermined voltages, diodes connected between said lines with their common terminal connected to the first terminal of the precision capacitor, and means for routing currents to said terminal to thereby charge and discharge the capacitor and cause the diodes to alternately conduct to clamp the voltage of the common terminal to the voltage of one or the other of said lines.

14. A voltage to frequency converter comprising an integrating network connected to receive a current proportional to an input signal, pulse generating means coupled to said network and serving to form an output pulse when the voltage on the network reaches a predetermined level, a precision capacitor having first and second terminals, first and second lines having predetermined voltages, a pair of uni-directional conducting devices connected between said lines with their common terminal connected to the first terminal of the precision capacitor, means responsive to the output of the pulse generating means for supplying alternately positive and negative current to said terminal to thereby charge and discharge the capacitor and cause the uni-directional means to alternately conduct to clamp the terminal to the voltage of one or the other of said lines, means for drawing current from said first line when current of one polarity is being supplied to said terminal, first and second current paths connected to the second terminal and each serving to separately route charge and discharge currents from the precision capacitor, and means for connecting one of said current paths to the integrating network.

15. A voltage to frequency converter as in claim 14 wherein said means for connecting one of said current paths to the integrating network includes a current dividing circuit.

16. A voltage to frequency converter as in claim 14 including additionally an inductive circuit connected in at least one of said current paths.

17. A voltage to frequency converter comprising an integrating network connected to receive an input signal, pulse generating means serving to produce pulses when the integrating network voltage reaches a predetermined level, said pulse generating means including means assuring completion of a pulse regardless of changes in voltage of the integrating network subsequent to start of a pulse, a precision capacitor having first and second terminals, means responsive to the pulses serving to swing the first terminal from a first voltage level to a second voltage level and back once for each applied pulse to cause flow of charging and discharging currents alternately through the precision capacitor, first and second current paths connected to the second terminal and serving to separately route charging and discharging currents to the precision capacitor, and means for connecting one of said current paths to the integrating network.

18. A voltage to frequency converter comprising an integrating capacitor connected to receive a current proportional to an input signal, pulse generating means serving to produce pulses when the integrating capacitor voltage reaches a predetermined voltage level, said pulse generating means serving to continuously operate when the voltage is above said predetermined level, a precision capacitor having first and second terminals, means responsive to the pulses serving to swing the first terminal from a first voltage level to a second voltage level and back once for each applied pulse to cause flow of charging and discharging current alternately through the precision capacitor, first and second current paths connected to the second terminal and serving to route charging and discharging current from the precision capacitor, and means for connecting one of said current paths to the integrating capacitor.

19. A voltage to frequency converter comprising an integrating network connected to receive an input signal, pulse generating means serving to form an output pulse when the voltage on the integrating network reaches a predetermined level, a precision capacitor having first and second terminals, first and second lines having predetermined voltages, means for regulating the voltage between said lines, a pair of uni-directional conducting devices connected between said lines with their common terminal connected to the first terminal of the precision capacitor, means responsive to the output of the pulse generating means for supplying alternately positive and negative current to said terminal to thereby charge and discharge the capacitor and cause the uni-directional means to alternately conduct to clamp the terminal to the voltage of one or the other of said lines, means for drawing current from said first line when current of one polarity is being supplied to said terminal, first and second current paths connected to the second terminal and each serving to separately route charge and discharge currents from the precision capacitor, and means for connecting one of said current paths to the integrating network.

20. A voltage to frequency converter as in claim 19 wherein said means for regulating the voltage comprises at least one voltage regulating semiconductor device.

References Cited in the file of this patent

UNITED STATES PATENTS

| | | |
|---|---|---|
| 2,824,229 | Gratian | Feb. 18, 1958 |
| 2,848,610 | Frienmuth | Aug. 19, 1958 |